United States Patent [19]

Hollmann

[11] Patent Number: 4,499,714
[45] Date of Patent: Feb. 19, 1985

[54] METHOD OF BALING, AND BALING PRESS

[75] Inventor: Bernd Hollmann, Bielefeld, Fed. Rep. of Germany

[73] Assignee: Claas Ohg, Harsewinkel, Fed. Rep. of Germany

[21] Appl. No.: 450,542

[22] Filed: Dec. 16, 1982

[30] Foreign Application Priority Data

Dec. 28, 1981 [DE] Fed. Rep. of Germany ....... 3151580

[51] Int. Cl.$^3$ .............................................. A01D 39/00
[52] U.S. Cl. ........................................ 56/341; 100/88
[58] Field of Search ................... 56/341, 343, DIG. 2; 100/88, 89, 77

[56]  References Cited

U.S. PATENT DOCUMENTS 4,262,478  4/1981  Pentith .................................. 56/341
4,288,971  9/1981  McClure ............................... 56/341

FOREIGN PATENT DOCUMENTS 2704982  2/1977  Fed. Rep. of Germany ........ 56/341
2634638  2/1978  Fed. Rep. of Germany ........ 56/341

Primary Examiner—Jay N. Eskovitz
Attorney, Agent, or Firm—Michael J. Striker

[57]  ABSTRACT

Agricultural stalk products are baled in a baling press by winding a product in a pressure chamber to form a round bale, displacing the pressure chamber in cooperation with peripherally limiting transport elements so as to block a further product supply into the pressure chamber and to release a product supply into a storage chamber, whereas the transport elements deflect a product flow and peripherally limit the storage chamber, fixing an outer contour of the round bale in the pressure chamber and opening the latter, displacing the transport elements so that they discharge the bale from the storage chamber, transfer the stored product from the storage chamber to the pressure chamber and guide a new product flow into the pressure chamber, and peripherally closing a bottom of the pressure chamber by the transport elements for forming a next bale in the pressure chamber.

15 Claims, 4 Drawing Figures

METHOD OF BALING, AND BALING PRESS

BACKGROUND OF THE INVENTION

The present invention relates to a method of continuously producing relatively large-volume roll bales of stalk products, and the like, with the use of an agricultural press which has a separable housing forming an approximately cylindrical pressure chamber limited at its ends by smooth walls and at its periphery by transport elements, and also a storage chamber associated with the pressure chamber. The invention also relates to a baling press of the above mentioned type.

Methods and presses of the above mentioned type are known in the art. They are used for recovery of loose agricultural products which lie in some cases in a swath and particularly produce therefrom round bales. In early times, agricultural workers turned in increasing degree to round bale forming machines for producing great round bales. In known agricultural machines a swath is converted into a cylindrical round bale, and the bales remain on the ground or on the field. In round bale forming machines of another type, the swath is taken up and processed above the ground to form a round bale. Both machines are provided with binding devices which bind the round bales and thereafter the required diameter and a predetermined strength are attained. Finally, the machines of both types discharge the bound round bales from the machine. Round bale forming machines in which the round bales are formed on the ground must move during the time interval from the region of the agricultural product collected to a swath, during which the bales are bound and unloaded, since during this time interval the machine cannot take up new product and further process the same prior to ending the above mentioned step. In the round bale forming machine in which the round bales are formed above the ground, the forward transport of the machine is restrained until the bale is bound with the binding twine and discharged, since in a machine of this type agricultural product cannot be taken up continuously or additionally during the above mentioned working step. In certain conditions of the field and product properties, the time which is required for binding and unloading of the bales reaches 50% and more of the entire time required for the process of forming bales proper. It is to be understood that, in this condition, the working capacity of a machine, especially counted for longer time and greater field units, is considerably limited.

U.S. Pat. No. 3,004,377 deals with known small round bale forming machines and contains a proposal to eliminate the above mentioned limitations. More particularly, the machine disclosed in this patent has an auxiliary transport device which accumulates the taken up hay and circulates it in an endless path of the machine which is spaced from the bale forming device proper. The bale winding step and the unloading of the bales are performed in the separate forming device. As soon as the finally formed round bales are discharged, the intermediately stored hay is supplied in accordance with a known step to the bale forming device of the machine together with the new hay taken up from the field, so as to form a next round bale. This known proposal has several disadvantages. First of all, there is a danger that because of continuous circulation of hay which is brought by the auxiliary transporter and intermediately stored, the binding and unloading steps of the finished bale lead to considerable spoilage losses, inasmuch as the intermediately stored agricultural product is in contact with mechanical devices during its circulation for a long time. Furthermore, there is a high probability that the auxiliary transport device of the machine collects more hay than required to form a bale, so that the machine must be periodically stopped during its travel to empty the auxiliary transporter. As a result of this, the machine driver must pay much attention to the auxiliary transport device of the machine. Finally, the continuous circulation of the loose hay of the auxiliary transporter considerably worsens the observation and control possibilities over the circulated product, which is necessary for providing uniform and gradual supply of the intermediately stored material to the bale forming device together with the product taken up from the field.

These disadvantages are eliminated in the proposal disclosed in German Offenlegungsschrift No. 2,704,982 in which the round bale forming press is provided with two separate bale winding chambers arranged one behind the other, so that the taken up and transported product can be continuously processed to a round bale without interruption of the machine travel. The agricultural product is supplied to the machine and transported for forming a round bale in a front winding chamber as considered in the travelling direction, and after partial formation of a round bale in the front winding chamber is transferred to the rear winding chamber. The disadvantage of this round bale forming press is that the provision of two separate winding chambers arranged one behind the other and provided with the associated aggregates leads to expenditures which are substantially equal to the expenditures in the event of provision of two completely separate winding presses, a smaller press for forming a preliminary bale and a larger press for forming a main bale in desired dimension. A further disadvantage is the complicated mechanics, particularly in the sense of transfer of the bales from the first winding chamber to the second winding chamber and power consumption of energy. Not the least disadvantage is that the arrangement one behind the other increases the length and inconvenience of space of the winding press. Moreover, the interruption of the material flow can lead to blocking of the machine.

SUMMARY OF THE INVENTION

Accordingly, it is an object of the present invention to provide a method of baling and a baling press which eliminate the disadvantages of the prior art.

More particularly, it is an object of the present invention to provide a method of baling and a baling press which satisfies the requirement of having a compact and sturdy structure and performs the baling process in a satisfactory manner.

In keeping with these objects and with others which will become apparent hereinafter, one feature of the present invention resides, briefly stated, in a method of baling in accordance with which a product is wound in a pressure chamber to form a round bale, the pressure chamber is displaced in cooperation with peripherally limiting transport elements so as to block further product supply into the pressure chamber and to release a product supply into the storage chamber with the transport elements deflecting the product flow and peripherally limiting the storage chamber; then fixing an outer contour of the round bale in the pressure chamber and opening the latter, displacing the transport elements so that they discharge the bale from the storage chamber, transfer the stored products from the storage chamber to the pressure chamber and guide a new product flow into the pressure chamber, and peripherally closing a bottom of the pressure chamber by the transport elements for forming a next bale in the pressure chamber take place.

Another feature of the present invention is a baling press which contains means for carrying out the above listed steps of the inventive method.

The novel features which are considered characteristic for the invention are set forth in particular in the appended claims. The invention itself, however, both as to its construction and its method of operation, together with additional objects and advantages thereof, will be best understood from the following description of specific embodiments when read in conjunction with the accompanying drawing.

DESCRIPTION OF THE PREFERRED EMBODIMENTS

Figure 1:
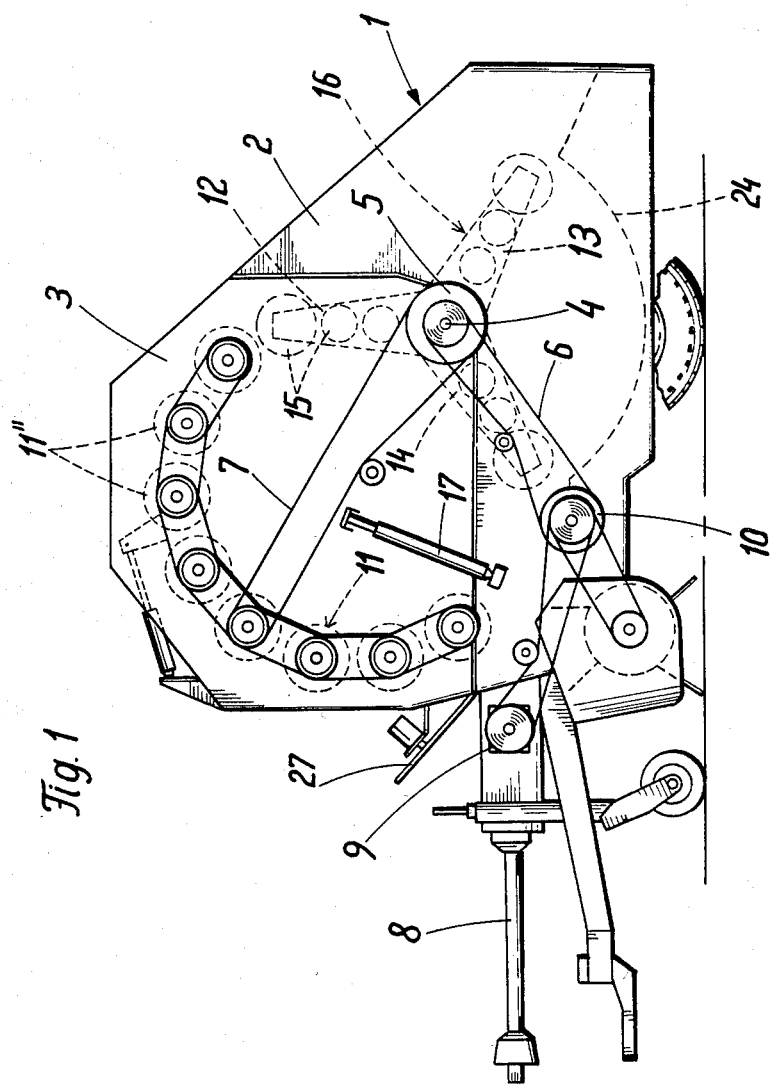
FIG. 1 is a side view of a round bale forming press in accordance with the invention.

A power press for making round bales is identified as a whole with reference numeral 1 and has two housings with reference numerals 2 and 3 respectively.

The housing 3 is supported turnable around an axle 4 of a three-leg turning star 16, whereas the axle 4 in turn is supported on the stationary housing 2. The axle 4 has an outwardly projecting portion which rotatably supports a two-stage belt pulley for two V-belts 6 and 7. The V-belt 6 is driven from a power take-off shaft 8 via a transmission 9 and an intermediate pulley 10. The thus produced rotary movement of the belt pulley 5 is then transmitted by the V-belt 7 in a known manner to rollers 11 supported in the housing 3.

Figure 2:
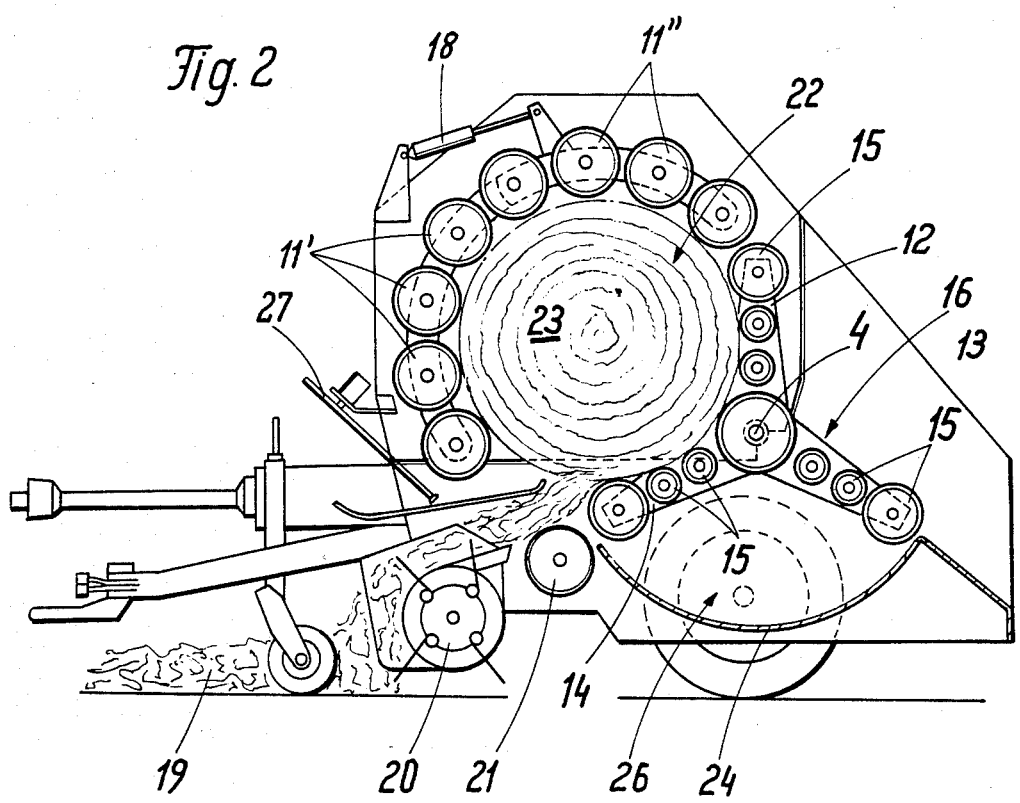
FIG. 2 is a side view of the round bale forming press with a removed side wall.

Rollers 15 carried by legs 12, 13 and 14 of the turning star 16 are driven from the belt pulley 5, for example via belts or chains. A hydraulic cylinder-and-piston unit 17 has a cylinder which is mounted on the stationary housing 2 and a piston with a piston rod connected with the turnable housing 3. Thereby the housing 3 can be turned around the axle 4 of the turning star 16. In a known manner, rollers 11' are fixed relative to the housing 3 and rollers 11'' are turnable for forming a discharge opening, with the aid of a hydraulic cylinder-and-piston unit 18, as shown in FIG. 2. A conventional device which is generally used in baling presses for binding a finished bale with a binding twine is fixedly connected in this construction with the turnable housing 3 for joint turning therewith.

As can be seen in FIG. 2, the agricultural product 19 is conveyed by a pick-up drum 20 having a plurality of prongs and a driven transfer roller 21 into a press chamber 22 which is formed by the roller 15 of the leg 14, the rollers 11' and 11'', and the roller 15 of the leg 12. A bale 23 is wound in the press chamber 22. A trough sheet 24 is arranged beneath the legs 13 and 14 and can be replaced by transport elements 25 which are driven in some cases. The sheet 24 and the rollers 15 of the legs 13 and 14 form a storage chamber 26 which in the position of the rotary star 16 shown in FIG. 2 is closed and no product is accommodated in this chamber. As soon as the bale 23 is formed, the hydraulic cylinder-and-piston unit 17 is actuated and the housing 3 is turned.

Figure 3:
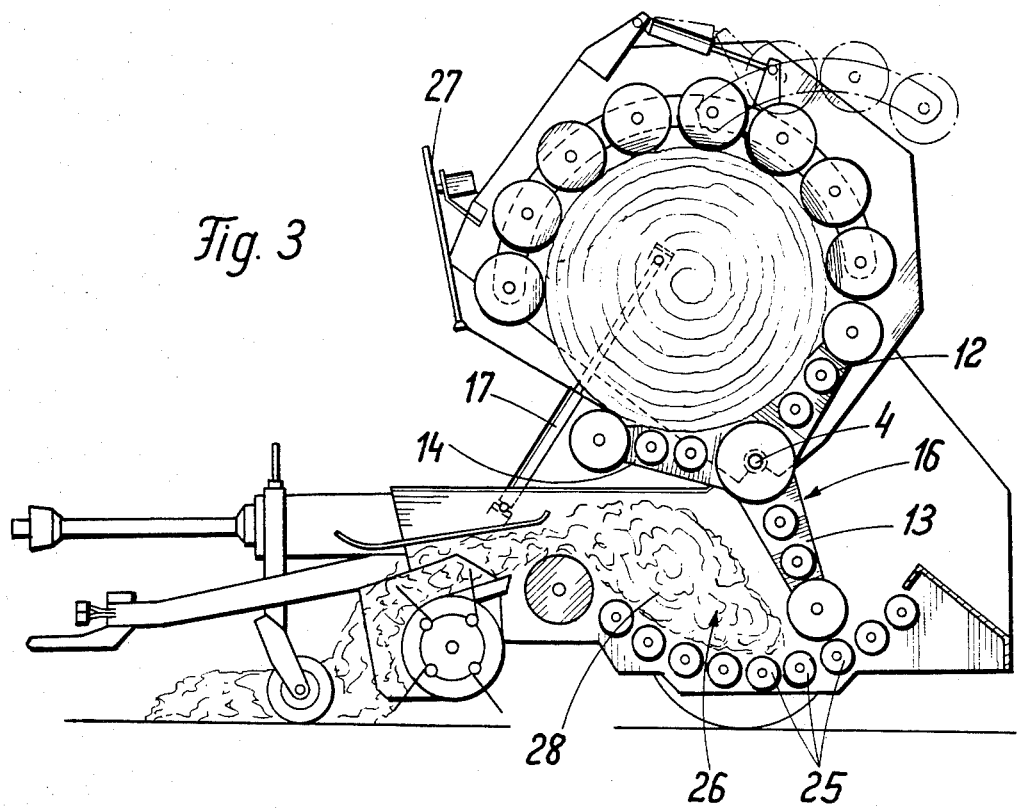
FIGS. 3 and 4 are views showing the round bale forming press in accordance with the present invention in two further operational positions.
Figure 4:
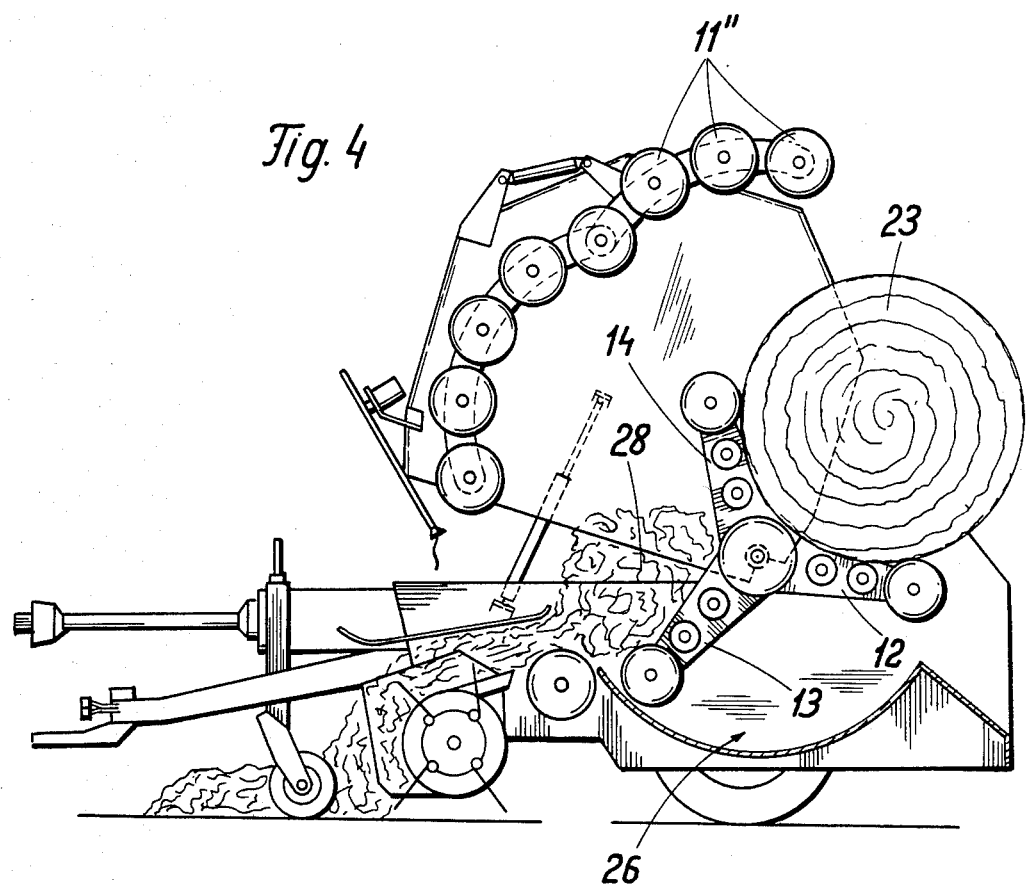

Simultaneously, the axle 4 of the turning star 16 is turned synchronously with the housing and thereby also the legs 12, 13 and 14 are turned. Thus, the position shown in FIG. 3 is assumed. In this position the storage chamber 26 is opened because of turning of the leg 14, and thereby simultaneously the product flow is directed instead of the pressure chamber 22 to the storage chamber 26. During this movement phase and at the end of the same the bale 23 is bound by a binding device 24 with a binding twine. After this the rollers 11'' and simultaneously the turning star 16 are turned to a position shown in FIG. 4.

The bale 23 then rolls from the rollers 15 of the legs 12 downwardly. The product 28 accumulated in the storage chamber 26 is turned by the leg 13 or the rollers 15 of the latter into the pressure chamber 22 without interrupting the product flow. Then all elements come back to the position shown in FIG. 2, with the difference that a part of the pressure chamber 22 is no longer limited by the legs 13 and 14 or their rollers and the storage chamber is no longer limited by the legs 12 and 13 or their rollers.

It will be understood that each of the elements described above, or two or more together, may also find a useful application in other types of constructions differing from the types described above.

While the invention has been illustrated and described as embodied in a baling press, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

I claim:

1. A baling press for stalk products, comprising
a displaceable pressure chamber for winding a product and forming a round bale therein;
a storage chamber arranged for storing a product and supplying it to said pressure chamber;
transport elements peripherally limiting said chambers and arranged so that when said pressure chamber displaces to block a further product supply into said pressure chamber and to release a product supply into said storage chamber said transport elements deflect a product flow and peripherally limit said storage chamber, when an outer contour of the round bale is fixed and said storage chamber is opened said transport elements are displaced so that they discharge the bale from the storage chamber, transfer the stored product from said storage chamber to said pressure chamber and guide a new product flow into the latter, and thereupon said transport elements peripherally close a bottom part of said pressure chamber to form a next bale; and further comprising a turnable star having three legs which support said transport elements, said turnable star having a part which forms a partition between said pressure chamber and said storage chamber.

2. A baling press as defined in claim 1, wherein said storage chamber is arranged under said pressure chamber, said turnable star having a part which peripherally limits said pressure chamber at its bottom side.

3. A baling press as defined in claim 1, wherein one leg of said turnable star supports the transport elements which peripherally limit a part of said pressure chamber, the other leg of said turnable star supporting the transport elements which peripherally limit a part of said storage chamber, and a third leg of said turnable star supporting the transport elements which peripherally limit a part of a pressure chamber and also a part of a storage chamber.

4. A baling press as defined in claim 1, wherein said turnable star has an axis of turning which is eccentric to said pressure chamber, said pressure chamber being rotatable about said axis.

5. A baling press as defined in claim 1, wherein said turnable star has an axis of turning, said pressure chamber having a housing which partially peripherally limits said pressure chamber and is rotatable about said axis.

6. A baling press as defined in claim 1, wherein said turnable star includes two three-leg members, said transport elements being formed as rollers supported between said threeleg members.

7. A baling press as defined in claim 1; and further comprising limiting elements arranged so that said storage chamber is limited between said limiting elements and two legs of said turnable star.

8. A baling press as defined in claim 7, wherein said limiting elements are formed as rollers.

9. A baling press as defined in claim 1, wherein each leg of said turnable star is formed as a deflector for deflecting the product flow.

10. A baling press as defined in claim 1, wherein said turnable star has an axis and is turnable about said axis by 120° from formation of a first bale to formation of a next bale.

11. A baling press as defined in claim 1, wherein one of said legs of said turnable star is formed so that it serves as a discharge ramp for finished bales.

12. A baling press as defined in claim 1, wherein said transport elements of said turnable star are drivable; and further comprising means for driving said transport elements.

13. A baling press as defined in claim 1; and further comprising limiting elements which peripherally limit a part of said pressure chamber and are jointly drivable with said transport elements; and further comprising means for jointly driving said limiting elements and said transport elements of said turnable star.

14. A baling press as defined in claim 1, wherein said pressure chamber has a housing which is rotatable synchronously with turning of said turnable star.

15. A baling press as defined in claim 14; and further comprising a cylinder-and-piston unit arranged to rotate said housing of said pressure chamber.

* * * * *